United States Patent
Klieman et al.

(10) Patent No.: US 8,280,143 B1
(45) Date of Patent: Oct. 2, 2012

(54) METHOD AND SYSTEM FOR ADDING CHECK INFORMATION TO AN ELECTRONIC TRANSACTION LISTING

(75) Inventors: Michael S. Klieman, Belmont, CA (US); Muhammet Serdar Akin, Santa Clara, CA (US)

(73) Assignee: Intuit Inc., Mountain View, CA (US)

( * ) Notice: Subject to any disclaimer, the term of this patent is extended or adjusted under 35 U.S.C. 154(b) by 959 days.

(21) Appl. No.: 12/269,485

(22) Filed: Nov. 12, 2008

(51) Int. Cl.
*G06K 9/00* (2006.01)
(52) U.S. Cl. .......................................... 382/137; 705/35
(58) Field of Classification Search .................. 382/137; 705/35
See application file for complete search history.

(56) References Cited

U.S. PATENT DOCUMENTS

| | | | |
|---|---|---|---|
| 7,664,304 B2 * | 2/2010 | Houle et al. | 382/137 |
| 7,711,622 B2 * | 5/2010 | Marceau et al. | 705/35 |
| 7,729,990 B2 * | 6/2010 | Marceau et al. | 705/45 |

* cited by examiner

*Primary Examiner* — Tom Y Lu
(74) *Attorney, Agent, or Firm* — McKay and Hodgson, LLP; Philip McKay; Sean P. Lewis

(57) ABSTRACT

A system and method for adding check information to an electronic transaction listing whereby a paper check, or copy of a paper check, is scanned into a computing system and converted to an electronic image of the paper check. One or more areas of the image of the paper check are identified and the image of the paper check is sub-divided into image sub-sections based on the content displayed in a given area/sub-section. One or more image sub-sections are copied from the electronic image of the paper check and then added to a check based financial transaction listing in a financial transaction list.

15 Claims, 4 Drawing Sheets

METHOD AND SYSTEM FOR ADDING CHECK INFORMATION TO AN ELECTRONIC TRANSACTION LISTING

BACKGROUND

Currently, many individuals, households, financial institutions, and businesses utilize computing system implemented financial management systems to manage finances and to provide insight into financial activity. Currently, various computing system implemented financial management systems are available including, but not limited to: on-line banking systems; computing system implemented personal and small business financial management systems; computing system implemented tax preparation systems; computing system implemented business accounting systems; and computing system implemented medical expense management systems; as well as various other electronic transaction and data driven, on-line or desktop financial management systems.

Computing system implemented financial management systems typically help users manage their finances by providing a centralized interface with banks, credit card companies, and other various financial institutions, for identifying and categorizing user financial transactions. Currently, computing system implemented financial management systems typically obtain financial transaction information, such as payee, payment amount, date, etc. via communication with banks, credit card providers, or other financial institutions, using electronic data transfer systems such as the Open Financial Exchange (OFX) specification, or various other systems for transferring financial transaction data.

Using on-line banking systems, or other computing system implemented financial management systems, one or more financial transactions are typically displayed in a listing of financial transactions that display the financial transaction information, typically in table format, with each row, or line, corresponding to a given financial transaction. In many cases, the financial transaction information is first obtained and formatted by a bank or other financial institution and displayed to a user via an on-line banking system, or other computing system implemented financial management system, sponsored by the bank or other financial institution. In some cases, the financial transaction information is also used by the on-line banking system, or other computing system implemented financial management system, sponsored by the bank or other financial institution to track events, such as purchase events, and to provide various financial data reports or displays including "to date" historical data reports such as historical spending data reports in particular categories and during defined timeframes. In some cases, the financial transaction information is also used by the on-line banking system, or other computing system implemented financial management system, sponsored by the bank or other financial institution for financial forecasting and/or budgeting.

In some cases, other, third party, computing system implemented financial management systems currently available download the financial information from the on-line banking system and use the financial transaction information to track events, such as purchase events, and to provide various financial data reports or displays including "to date" historical data reports such as historical spending data reports in particular categories and during defined timeframes. In some cases, other, third party, computing system implemented financial management systems currently available download the financial information from the on-line banking system and use the financial transaction information for financial forecasting and/or budgeting.

While electronic funds transfers have rapidly become one of the most common methods for completing financial transactions, at the time of filing, over 50% of all financial transactions in the United States are still conducted/completed using paper checks. This fact represents a significant problem for on-line banking systems and/or other types of computing system implemented financial management systems because it is extremely difficult to obtain computer usable data from a paper check. The problem is difficult enough for printed information on a check, however, it is often the case that the information is filled out in cursive, and/or printed, hand written text. The problem is so difficult that currently available Optical Character Recognition (OCR) systems are typically unable to efficiently process data from paper checks and therefore banks and other financial institutions have largely abandoned this approach.

To partially solve this problem, some on-line banking systems and/or other types of computing system implemented financial management systems, currently obtain only check the information associated with payment processing such as check number, payment amount, and date, and then some on-line banking systems and/or other types of computing system implemented financial management systems do include this limited information in transaction listings including the check based financial transaction. While having check number, payment amount, and date, displayed in a transaction listings is better than having no information at all, important information needed by the user to review, categorize, and understand check based financial transactions, such as the payee involved and any memo entries, is currently not obtained from paper checks by banks and other financial institutions due to the difficulties of obtaining this information discussed above. As a result, this often critical information is typically not included and/or presented in any check based transaction listings.

This lack of important check information, such as the payee involved and any memo entries, associated with check based transactions appearing in transaction listings is not only problematic in that the user typically is often very interested in having this information readily available, but the lack of complete information also makes automatic categorization of check based transactions by other computing system implemented financial management systems virtually impossible.

Some currently available on-line banking systems, and/or other types of computing system implemented financial management systems, attempt to resolve this problem by providing scanned in copies of a given check that can be accessed by clicking a link in the transaction listings. However, once the link is clicked, the image of the paper check must be downloaded, typically in a PDF or bitmap format, and this process takes time and typically requires transferring the viewer to another screen display or superimposing the check image over the current screen. This situation typically causes the user to lose a significant amount of time and often the contextual setting of the transaction. This situation is problematic enough when details regarding a single check based transaction are desired, however, it is often the case that details regarding multiple check based transactions are desired. In addition, the provision of a link to download an image of a paper check does nothing to solve the issue of automatic categorization of check based transactions by other computing system implemented financial management systems, i.e., even with access to a paper check image, automatic categorization of check based transactions by other computing system implemented financial management systems is still virtually impossible without significant manual user input.

As a result of the situation discussed above, currently over 50% of all financial transactions, those conducted using paper checks, result in incomplete check information being associated with the check based transactions in transaction listings. This is not only far from ideal for users, but it also prevents automatic categorization of check based transactions by other computing system implemented financial management systems.

SUMMARY

In accordance with one embodiment, a system and method for adding check information to an electronic transaction listing includes a process whereby a paper check, or copy of a paper check, is scanned into a computing system and converted to an electronic image of the paper check. In one embodiment, one or more areas of the image of the paper check are identified and the image of the paper check is sub-divided into image sub-sections based on the content displayed in a given area/sub-section. In one embodiment, one or more image sub-sections are copied from the electronic image of the paper check. In one embodiment, one or more of the copied image sub-sections are then added to a check based financial transaction listing in a financial transaction list. In one embodiment, the one or more copied image sub-sections are added to a check based financial transaction listing in a financial transaction list as in-line information along with the other check based financial transaction information. In one embodiment, once the one or more image sub-sections are copied from the electronic image of the paper check and/or the one or more of the copied image sub-sections are added to a check based financial transaction listing in a financial transaction list, the user is provided the opportunity to correlate/translate the image sub-sections to user entered names, categories, and/or other data in computer readable text so that future instances of the same image sub-sections are replaced with the correlated computer readable text.

In one embodiment, a given paper check, or a copy of a given paper check, is scanned into a computing system to create an electronic image of the paper check using any one of numerous known methods for scanning a paper document into a computing system to create an electronic image of the paper document. In one embodiment, a copy of a given paper check is scanned into a computing system to create an electronic image of the paper check by a vendor and/or payee. In one embodiment, a copy of a given paper check is scanned into a computing system to create an electronic image of the paper check by a bank or other financial institution. In one embodiment, a copy of a given paper check is scanned into a computing system to create an electronic image of the paper check through an on-line banking system or other computing system implemented financial management system.

Methods, means, mechanisms, process and systems for scanning a paper document into a computing system to create an electronic image of the paper document are well known in the art. Consequently, a more detailed discussion of specific methods, means, mechanisms, processes and systems for scanning a paper document into a computing system to create an electronic image of the paper document are omitted here to avoid detracting from the invention.

In one embodiment, the one or more areas of the check that are identified and sub-divided into image sub-sections based on content of the given image sub-sections include, but are not limited to, the image sub-section including the payee name, and/or the image sub-section including any check memo entry, and/or the image sub-section including the payer's signature. In one embodiment, the image sub-sections and their content are identified based on typical location of the content in a typical paper check. In one embodiment, the image sub-sections and their content are identified based on identified key words such as "payable to", "to", or "memo". In one embodiment, the image sub-sections and their content are identified based on typical location of the content in a specific bank's paper check as identified from printed codes on the paper check. In one embodiment, the image sub-sections and their content are identified based on typical location of the content in a paper checks from given region or country. In one embodiment, the image sub-sections and their content are identified based on any combination of these methods and/or other method and/or process for identifying an image sub-section and its content discussed herein, and/or known in the art at the time of filing, and/or as developed after the time of filing.

In one embodiment, one or more of the image sub-sections are copied from the electronic image of the paper check by any one of numerous methods, means, mechanisms, process, and systems for copying and/or cutting a portion of an electronic image of a paper document that are well known in the art. Consequently, a more detailed discussion of specific methods, means, mechanisms, process, and systems for copying and/or cutting a portion of an electronic image of a paper document are omitted here to avoid detracting from the invention.

In one embodiment, one or more of the copied image sub-sections are then added and/or copied and/or pasted into the check based financial transaction listing in a financial transaction list. In one embodiment, one or more of the copied image sub-sections are then added and/or copied and/or pasted into the check based financial transaction listing in a financial transaction list as information displayed in-line, i.e., as part of the same row and/or entry, as the other financial information associated with the check based financial transaction in the financial transaction listing.

In one embodiment, one or more of the copied image sub-sections are added and/or copied and/or pasted into the check based financial transaction listing in a financial transaction list by any one of numerous methods, means, mechanisms, process, and systems for adding and/or copying and/or pasting a portion of an electronic image into an electronic data document well known in the art. Consequently, a more detailed discussion of specific methods, means, mechanisms, process, and systems for adding and/or copying and/or pasting a portion of an electronic image into an electronic data document are omitted here to avoid detracting from the invention.

In one embodiment, once the one or more image sub-sections are copied from the electronic image of the paper check and/or the one or more of the copied image sub-sections are added to a check based financial transaction listing in a financial transaction list, the user is provided the opportunity to correlate/translate the image sub-sections to user entered names, categories, and/or other data in computer readable text.

For instance, in one embodiment, once an image sub-section including a payee name is copied from the electronic image of a paper check and/or added to a check based financial transaction listing in a financial transaction list, the user is provided the opportunity manually enter the payee name in a computer readable text format, in one embodiment through a text entry field in a user interface. Then, whenever an image sub-section including the that payee name is copied from an electronic image of a paper check the computer readable text is substituted and/or included in the check based financial transaction listing in a financial transaction list, as computer readable text. Consequently, the payee name, or other data, in computer readable text can be used by any computing system implemented financial management system to automatically categorize the check based transactions.

In various embodiments, any method, means, process and/or system is utilized to substitute the computer readable text for the image sub-section such as any of those discussed herein, known in the art at the time of filing, and/or as developed after the time of filing.

Several methods, means, processes and systems for substituting computer readable text for an electronic image are known in the art. Consequently, a more detailed discussion of specific methods, means, processes and systems for substituting computer readable text for an electronic image is omitted her to avoid detracting from the invention.

As another example, the user is provided the opportunity manually enter a category to be associated with one or more image sub-sections including one or more payee names, or one or more image sub-sections including one or more memo entries, or one or more image sub-sections including the payer's signature, in a computer readable text format, in one embodiment through a text entry field in a user interface. Then, whenever similar image sub-sections including one or more payee names, or one or more image sub-sections including one or more memo entries, or one or more image sub-sections including the payer's signature, are copied from the electronic image of paper checks the computer readable text is substituted and/or included in the check based financial transaction listing in a financial transaction list. Consequently, the payee name, memo entry, signature data, or other data, image sub-sections can be used to automatically categorize the check based transactions.

Using the system and method for adding check information to an electronic transaction listing, as disclosed herein, the over 50% of all financial transactions currently conducted using paper checks can be displayed in a transaction listing along with any desired information included in the paper check. In addition, using the system and method for adding check information to an electronic transaction listing, as disclosed herein, this desired information included in the paper check is displayed within the electronic transaction listing without requiring any further user input, without waiting for an image to download, and with the use of any addition screen displays. Consequently, using the system and method for adding check information to an electronic transaction listing, as disclosed herein, a user can easily view any and/or all information related to paper check transactions at a glance.

In addition, in one embodiment, using the system and method for adding check information to an electronic transaction listing, as disclosed herein, the displayed information included in the paper check is converted into computer readable data with minimal user interaction and then re-used/substituted to automatically include the desired information in the electronic transaction listing, as computer readable data, in all subsequent listing of similar paper check based transactions. Consequently, using the system and method for adding check information to an electronic transaction listing, as disclosed herein, computing system implemented financial management systems can automatically categorize check based transactions.

In addition, as discussed in more detail below, using the below embodiments, with little or no modification and/or user input, there is considerable flexibility, adaptability, and opportunity for customization to meet the specific needs of various users under numerous circumstances.

Figure 1:
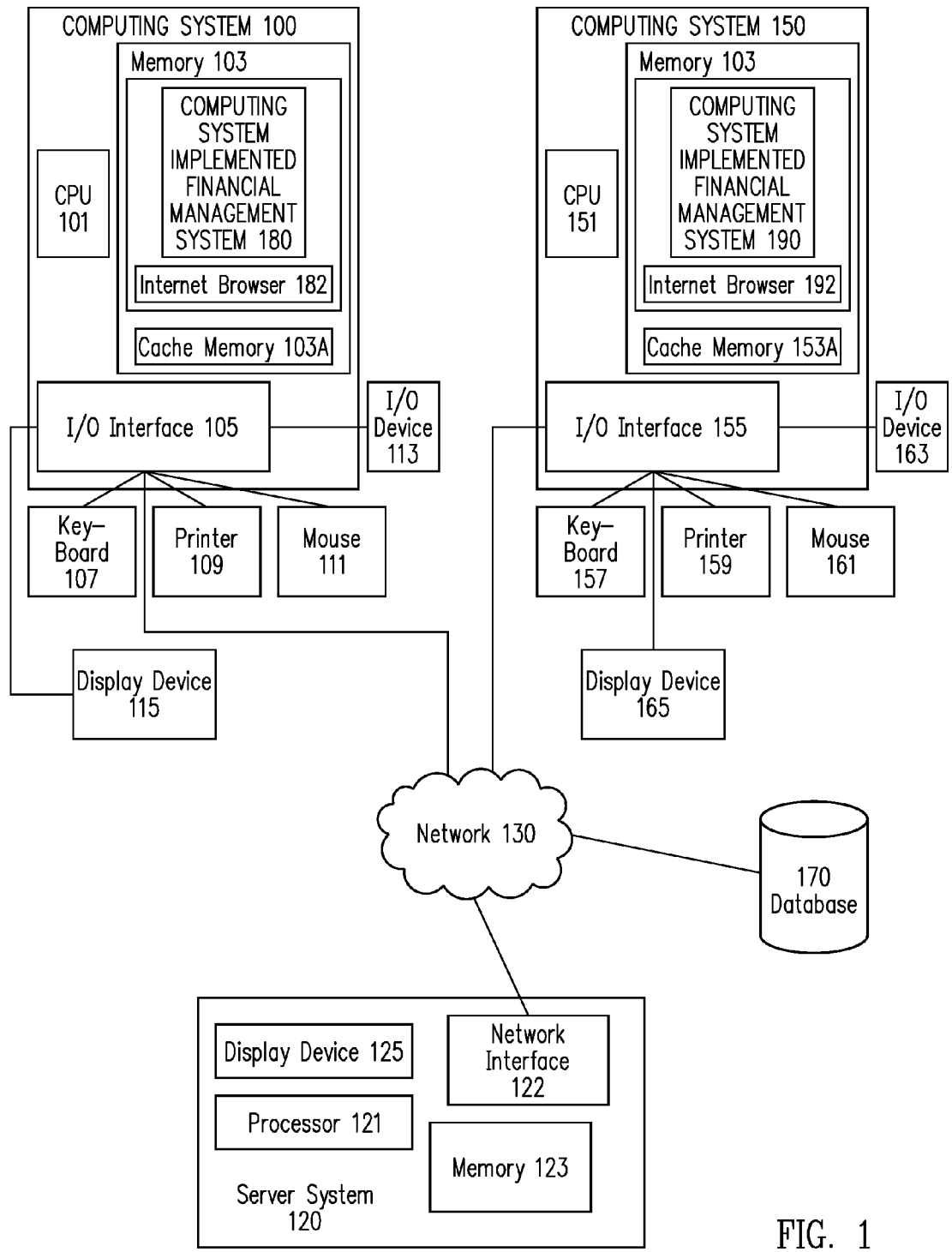
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a system and method for adding check information to an electronic transaction listing includes a process whereby a paper check, or copy of a paper check, is scanned into a computing system and converted to an electronic image of the paper check. In one embodiment, one or more areas of the image of the paper check are identified and the image of the paper check is sub-divided into image sub-sections based on the content displayed in a given area/sub-section. In one embodiment, one or more image sub-sections are copied from the electronic image of the paper check. In one embodiment, one or more of the copied image sub-sections are then added to a check based financial transaction listing in a financial transaction list. In one embodiment, the one or more copied image sub-sections are added to a check based financial transaction listing in a financial transaction list as in-line information along with the other check based financial transaction information. In one embodiment, once the one or more image sub-sections are copied from the electronic image of the paper check and/or the one or more of the copied image sub-sections are added to a check based financial transaction listing in a financial transaction list, the user is provided the opportunity to correlate/translate the image sub-sections to user entered names, categories, and/or other data in computer readable text so that future instances of the same image subsections are replaced with the correlated computer readable text.

FIG. 1 is a block diagram of an exemplary hardware architecture for implementing one embodiment of a system and method for adding check information to an electronic transaction listing, such as exemplary process 200(FIG. 2) and/or exemplary process 300(FIG. 3) discussed herein, that, returning to FIG. 1, includes: a computing system 100, e.g., a first computing system; a computing system 150, e.g., a second computing system; a server system 120; and a database 170, all operatively coupled by a network 130.

As seen in FIG. 1, computing system 100 typically includes a central processing unit (CPU) 101, an input/output (I/O) interface 105, and a memory system 103, including cache memory 103A. In one embodiment, memory system 103 includes all, or part, of a computing system implemented financial management system 180 such as any computing system implemented financial management system defined herein, known in the art at the time of filing, and/or as developed thereafter. In one embodiment, computing system implemented financial management system 180 is stored, in whole, or in part, in memory system 103, and is used by, or includes, or is accessed by, a process for adding check information to an electronic transaction listing (not shown in FIG. 1, see FIG. 2).

Returning to FIG. 1, computing system 100 may further include standard user interface devices such as a keyboard 107, a mouse 111, a printer 109, and a display device 115, as well as, one or more standard input/output (I/O) devices 113, such as a compact disk (CD) or Digital Video Disc (DVD) drive, floppy disk drive, or other digital or waveform port, or other device capable of inputting data to, and outputting data from, computing system 100, whether available or known at the time of filing or as later developed. As discussed in more detail below, in one embodiment, a process for adding check information to an electronic transaction listing, and/or a computing system implemented financial management system, are entered, in whole, or in part, into computing system 100 via I/O device 113, such as from a CD, DVD, floppy disk, portable hard drive, memory stick, download site, or other medium and/or computer program product as defined herein.

In one embodiment, computing system 100 also includes an Internet browser capability 182 that, in one embodiment, includes a search engine (not shown) and is stored, in whole, or in part in memory 103.

In one embodiment, data representing financial transactions associated with one or more users, and/or images representing one or more paper checks, are stored, in whole, or in part, in memory system 103, and are used by, or are accessed by, a process for adding check information to an electronic transaction listing and/or one or more users. In one embodiment, computing system
100 is a computing system accessible by one or more users. In one embodiment, computing system 100 is used, and/or accessible, by another computing system, such as computing system 150 (discussed below).

In one embodiment, computing system 100 is used, controlled, and/or accessible by, a provider of and/or a computing system implemented financial management system and data representing all, or part, of financial data associated with one or more users, is stored in computing system 100, typically in accounts associated with a given user.

Computing system 100 can be any computing system as defined herein and/or as known in the art at the time of filing and/or as developed thereafter, that includes components that can execute all, or part, of a process for adding check information to an electronic transaction listing, and/or a computing system implemented financial management system, in accordance with at least one of the embodiments as described herein.

Similarly, computing system 150 typically includes a CPU 150, an input/output (I/O) interface 155, and a memory system 153, including cache memory 153A. Similar to computing system 100, computing system 150 may further include standard user interface devices such as a keyboard 157, a mouse 161, a printer 159, and a display device 165, as well as, one or more standard input/output (I/O) devices 163, such as a compact disk (CD) or DVD drive, floppy disk drive, or other digital or waveform port, or other device capable of inputting data to, and outputting data from, computing system 150, whether available or known at the time of filing or as later developed.

In one embodiment, computing system 150 also includes an Internet browser capability 192 that, in one embodiment, includes a search engine (not shown) and is stored, in whole, or in part in memory 153.

In one embodiment, memory system 153 includes all, or part, of a computing system implemented financial management system 190, such as any computing system implemented financial management system defined herein, known in the art at the time of filing, and/or as developed thereafter. In one embodiment, computing system implemented financial management system 190 is stored, in whole, or in part, in memory system 153, and is used by, or includes, or is accessed by, a process for adding check information to an electronic transaction listing.

In one embodiment, data representing financial transactions associated with one or more users, and/or images representing one or more paper checks, are stored, in whole, or in part, in memory system 153, and are used by, or are accessed by, a process for adding check information to an electronic transaction listing and/or one or more users. In one embodiment, computing system 150 is a computing system accessible by one or more users. In one embodiment, computing system 150 is used, and/or accessible, by another computing system, such as computing system 100.

In one embodiment, computing system 150 is used, controlled, and/or accessible by, a provider of and/or a computing system implemented financial management system and data representing all, or part, of financial data associated with one or more users is stored in computing system 150, typically in accounts associated with a given user.

Computing system 150 can be any computing system as defined herein and/or as known in the art at the time of filing and/or as developed thereafter, that includes components that can execute all, or part, of a process for adding check information to an electronic transaction listing, and/or a computing system implemented financial management system, in accordance with at least one of the embodiments as described herein.

As discussed in more detail below, in one embodiment, all, or part, of a process for adding check information to an electronic transaction listing, and/or a computing system implemented financial management system, and/or financial data associated with one or more users, and/or images representing one or more paper checks can be loaded, in whole, or in part, into computing system 150 from computing system 100 for storage in memory system 153 and/or cache memory 153A.

Also shown in FIG. 1 is database 170. In one embodiment, database 170 is a data storage device, a designated server system or computing system, or a designated portion of one or more server systems or computing systems, such as computing systems 100, 150 and server system 120, or a distributed database, or an external and/or portable hard drive. In one embodiment, database 170 is a dedicated mass storage device implemented in software, hardware, or a combination of hardware and software. In one embodiment, database 170 includes a web-based function. As discussed in more detail below, in one embodiment, database 170 is under the control of, or otherwise accessible by, a given user and/or user, and/or one or more agents for a given user and/or user, and/or a process for adding check information to an electronic transaction listing, and/or a computing system implemented financial management system.

In one embodiment, data representing financial transactions associated with one or more users, and/or images representing one or more paper checks, are stored, in whole, or in part, in database 170, and are used by, or are accessed by, a process for adding check information to an electronic transaction listing. In one embodiment, database 170 is accessible by one or more users. In one embodiment, database 170 is used, and/or accessible, by a computing system, such as computing systems 100 and/or 150, and/or a server system, such as sever system 120 (discussed below).

In one embodiment, database 170 is used, controlled, and/or accessible by, a provider of and/or a computing system implemented financial management system and data representing all, or part, of financial data associated with one or more users is stored in database 170.

In one embodiment, computing systems 100 and 150, and database 170, are coupled to a server system 120 through network 130. In one embodiment, server system 120 includes a server system display device 125, a server system processor 121, a server system memory 123, and a server system network interface 122.

In one embodiment, server system 120 is used in a station-to-station arrangement, such as a peer-to-peer, or hybrid peer-to peer, arrangement, as an indexing and/or central server used to connect a first computing system, such as computing system 100, and a second computing system, such as computing system 150.

In one embodiment, financial data associated with one or more users is stored, in whole, or in part, in server system 120, and is used by, or is accessed by, a process for adding check information to an electronic transaction listing. In one embodiment, server system 120 is accessible by one or more users. In one embodiment, server system 120 is used, and/or accessible, by a computing system, such as computing systems 100 and/or 150, and/or one or more databases, such as database 170.

In one embodiment, server system 120 is used, controlled, and/or accessible by, a provider of and/or a computing system implemented financial management system and data representing all, or part, of data representing financial transactions associated with one or more users, and/or images representing one or more paper checks, is stored in server system 120.

Network 130 can be any network or network system as defined herein, and/or known in the art at the time of filing, and/or as developed after the time of filing, capable of allowing communication between two or more computing systems, server systems, and/or databases.

Those of skill in the art will readily recognize that the components shown in FIG. 1, such as computing systems 100 and 150, database 170, server system 120, and their respective components, are shown for illustrative purposes only and that architectures with more or fewer components can implement, and benefit from, one or more embodiments. Moreover, one or more components of computing system 100, computing system 150, database 170, and server system 120 may be located remotely from their respective system and accessed via network 130. In addition, the particular type of, and configuration of, computing systems 100 and 150, database 170, and server system 120 are not relevant.

As discussed in more detail below, in one embodiment, a process for adding check information to an electronic transaction listing, and/or a computing system implemented financial management system, data representing financial transactions associated with one or more users, and/or images representing one or more paper checks, is stored, in whole, or in part, in memory system 103 and/or cache memory 103A, of computing system 100, and/or memory system 153 and/or cache memory 153A of computing system 150, and/or in server memory system 123 of server system 120 and/or in database 170, and executed on computing system 100 and/or computing system 150. As used herein, a memory refers to a volatile memory, a non-volatile memory, or any combination of the two.

Although a process for adding check information to an electronic transaction listing, and/or a computing system implemented financial management system, are sometimes referred to herein, alternatively, as a process, an application, a module, a program, a component of a software system, a component of a software package, a component of a parent system, a plug-in, or a feature of a parent system, this terminology is illustrative only. In some embodiments, a process for adding check information to an electronic transaction listing and/or a computing system implemented financial management system are capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPUs 101 and 150, or server system processor 121. In one embodiment, execution of a process by CPU 101, CPU 150, or server system processor 121, results in the operations of an agent computer process (not shown) and/or a rule computer process (not shown).

In one embodiment, a process for adding check information to an electronic transaction listing, and/or a computing system implemented financial management system, data representing financial transactions associated with one or more users, and/or images representing one or more paper checks, are computer applications or processes and/or data implemented and/or run and/or stored, in full, or in part, in, or on, and/or through, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, such as server system 120 of FIG. 1, and signals transmitted over a network, such as network 130 of FIG. 1, or other media or process capable of delivering computer readable data representing computer readable code, whether available or known at the time of filing or as later developed. This medium may belong to a computing system, such as computing systems 100 and 150 of FIG. 1, described above. However, in some embodiments, the medium also may be removable and/or remote from the computing system.

Process

Herein, the terms "user" and "consumer" include any person, party, business, system, application, organization, and/or entity interacting with, interfacing with, contacting, viewing, accepting data from, requesting data from, and/or otherwise associating with the process for adding check information to an electronic transaction listing for any purpose.

Herein the term "financial institution" includes any entity, party, person, application and/or system, such as, but not limited to, banks, credit card companies, asset account companies, and/or investment firms, that engages in money/asset/debt management and/or financial transaction management/recording and/or display.

As used herein, the term "computing system", includes, but is not limited to: a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

As used herein, the term "computing system implemented financial management system" includes, but is not limited to: computing system implemented on-line banking systems, packages, programs, modules, or applications; computing system implemented personal and small business financial management systems, packages, programs, modules, or applications; computing system implemented business systems, packages, programs, modules, or applications; computing system implemented marketing device distribution systems, packages, programs, modules, or applications; computing system implemented financial institution financial management systems, packages, programs, modules, or applications; computing system implemented tax preparation systems, packages, programs, modules, or applications; computing system implemented accounting and/or invoicing systems, packages, programs, modules, or applications; computing system implemented business and/or point of sale systems, packages, programs, modules, or applications; computing system implemented healthcare management systems, packages, programs, modules, or applications and various other electronic data driven data management systems, packages, programs, modules, or applications, whether known at the time of filling or as developed later.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, whether available or known at the time of filing or as later developed.

As used herein, the term "database" includes, but is not limited to, any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as defined herein, known at the time of filing, or as developed thereafter.

In accordance with one embodiment, a system and method for adding check information to an electronic transaction listing includes a process whereby a paper check, or copy of a paper check, is scanned into a computing system and converted to an electronic image of the paper check. In one embodiment, one or more areas of the image of the paper check are identified and the image of the paper check is sub-divided into image sub-sections based on the content displayed in a given area/sub-section. In one embodiment, one or more image sub-sections are copied from the electronic image of the paper check. In one embodiment, one or more of the copied image sub-sections are then added to a check based financial transaction listing in a financial transaction list. In one embodiment, the one or more copied image sub-sections are added to a check based financial transaction listing in a financial transaction list as in-line information along with the other check based financial transaction information. In one embodiment, once the one or more image sub-sections are copied from the electronic image of the paper check and/or the one or more of the copied image sub-sections are added to a check based financial transaction listing in a financial transaction list, the user is provided the opportunity to correlate/translate the image sub-sections to user entered names, categories, and/or other data in computer readable text so that future instances of the same image sub-sections are replaced with the correlated computer readable text.

Figure 2:
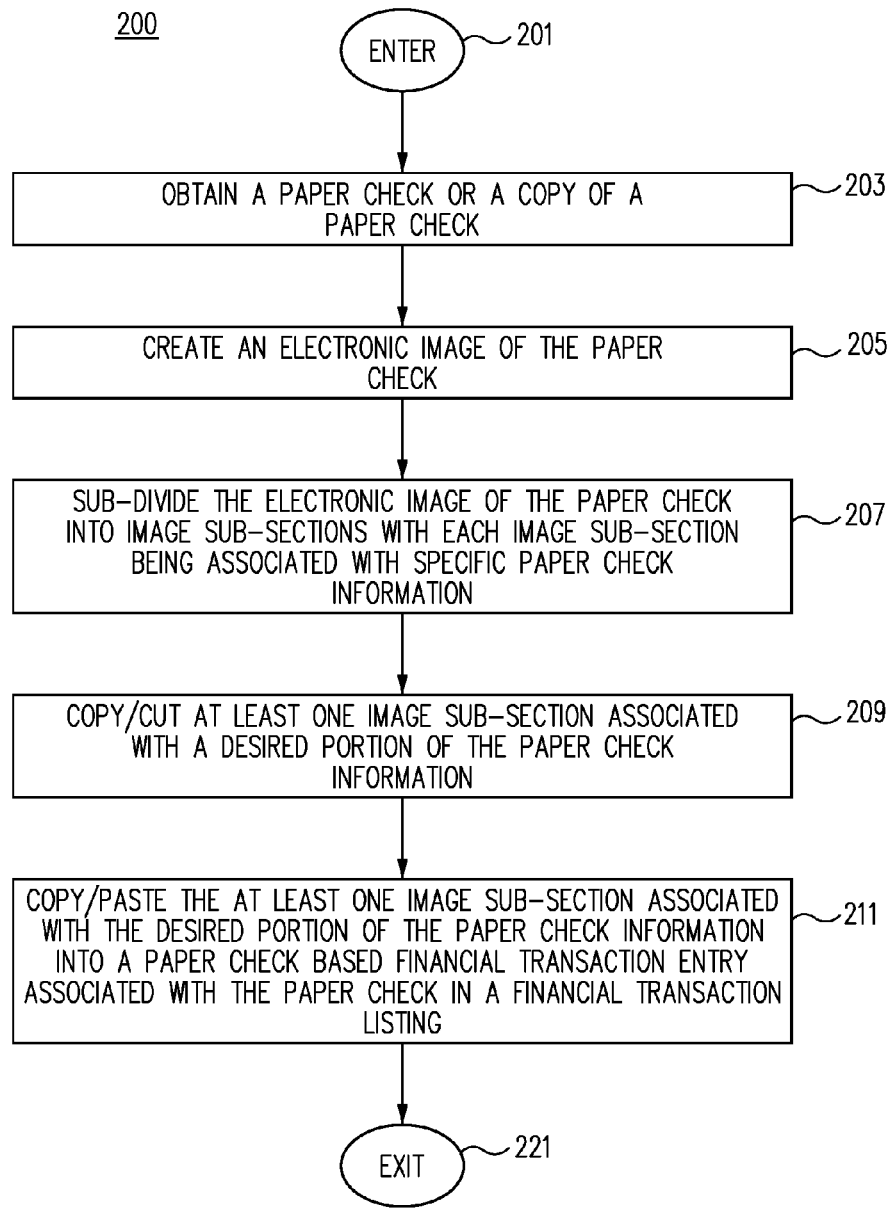
FIG. 2 is a flow chart depicting a process for adding check information to an electronic transaction listing in accordance with one embodiment.

FIG. 2 is a flow chart depicting a process for adding check information to an electronic transaction listing 200 in accordance with one embodiment. Process for adding check information to an electronic transaction listing 200 begins at ENTER OPERATION 201 and process flow proceeds to OBTAIN A PAPER CHECK OR A COPY OF A PAPER CHECK OPERATION 203.

In one embodiment, at OBTAIN A PAPER CHECK OR A COPY OF A PAPER CHECK OPERATION 203 a paper check, or copy of a paper check, is obtained by process for adding check information to an electronic transaction listing 200, and/or a computing system implemented financial management system associated with process for adding check information to an electronic transaction listing 200.

In one embodiment, once a paper check, or copy of a paper check, is obtained by process for adding check information to an electronic transaction listing 200, and/or a computing system implemented financial management system associated with process for adding check information to an electronic transaction listing 200, at OBTAIN A PAPER CHECK OR A COPY OF A PAPER CHECK OPERATION 203, process flow proceeds to CREATE AN ELECTRONIC IMAGE OF THE PAPER CHECK OPERATION 205.

In one embodiment, at CREATE AN ELECTRONIC IMAGE OF THE PAPER CHECK OPERATION 205 the paper check, or copy of a paper check, of OBTAIN A PAPER CHECK OR A COPY OF A PAPER CHECK OPERATION 203 is scanned into a computing system and/or otherwise converted to an electronic image of the paper check.

In one embodiment, at CREATE AN ELECTRONIC IMAGE OF THE PAPER CHECK OPERATION 205 the paper check, or copy of a paper check, of OBTAIN A PAPER CHECK OR A COPY OF A PAPER CHECK OPERATION 203 is scanned into a computing system, such as computing systems 100 and/or 150 of FIG. 1, or server system 120 of FIG. 1, to create an electronic image of the paper check using any one of numerous known methods for scanning a paper document into a computing system to create an electronic image of the paper document.

Returning to FIG. 2, in one embodiment, at CREATE AN ELECTRONIC IMAGE OF THE PAPER CHECK OPERATION 205 the paper check, or copy of a paper check, of OBTAIN A PAPER CHECK OR A COPY OF A PAPER CHECK OPERATION 203 is scanned into a computing system to create an electronic image of the paper check by a vendor and/or payee at the time of payment.

In one embodiment, at CREATE AN ELECTRONIC IMAGE OF THE PAPER CHECK OPERATION 205 the paper check, or copy of a paper check, of OBTAIN A PAPER CHECK OR A COPY OF A PAPER CHECK OPERATION 203 is scanned into a computing system to create an electronic image of the paper check by a bank or other financial institution. Indeed, in many cases banks, and/or other financial institutions, already perform this task as part of their normal payment processing.

In one embodiment, at CREATE AN ELECTRONIC IMAGE OF THE PAPER CHECK OPERATION 205 the paper check, or copy of a paper check, of OBTAIN A PAPER CHECK OR A COPY OF A PAPER CHECK OPERATION 203 is scanned into a computing system to create an electronic image of the paper check through an online banking system or other computing system implemented financial management system.

In one embodiment, at CREATE AN ELECTRONIC IMAGE OF THE PAPER CHECK OPERATION 205 the paper check, or copy of a paper check, of OBTAIN A PAPER CHECK OR A COPY OF A PAPER CHECK OPERATION 203 is converted to a an electronic image of the paper check by any means, mechanism, process, or system, as discussed herein, and/or as known in the art at the time of filing, and/or as developed after the time of filing.

Figures 2A, 2B:
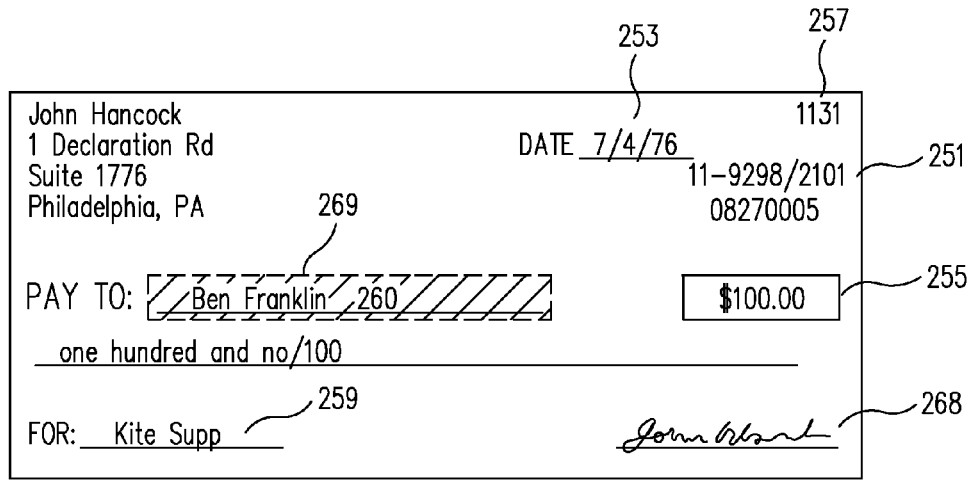
FIG. 2A is a representation of an electronic image of a paper check including a payee image sub-section in accordance with one embodiment.
FIG. 2B is a representation of a financial transaction list including a check based financial transaction listing associated with the electronic image of a paper check of FIG. 2A and including the pasted payee image sub-section of FIG. 2A added into the check based financial transaction listing line in accordance with one embodiment.

FIG. 2A is a representation of one specific example an electronic image of a paper check 251, which in this specific example, includes: a check number area 257; a date area 253; an amount area 255; a memo area 259; a signature area 268 and a payee area 260.

In this specific example, electronic image of a paper check 251 is an electronic image of a paper check, or a copy of a paper check obtained at OBTAIN A PAPER CHECK OR A COPY OF A PAPER CHECK OPERATION 203 (FIG. 2A) and scanned into a computing system and/or otherwise converted to an electronic image of the paper check at CREATE AN ELECTRONIC IMAGE OF THE PAPER CHECK OPERATION 205.

Methods, means, mechanisms, process and systems for scanning a paper document into a computing system to create an electronic image of the paper document are well known in the art. Consequently, a more detailed discussion of specific methods, means, mechanisms, processes and systems for scanning a paper document into a computing system to create an electronic image of the paper document are omitted here to avoid detracting from the invention.

In one embodiment, once the paper check, or copy of a paper check, of OBTAIN A PAPER CHECK OR A COPY OF A PAPER CHECK OPERATION 203 is scanned into a computing system and/or otherwise converted to an electronic image of the paper check at CREATE AN ELECTRONIC IMAGE OF THE PAPER CHECK OPERATION 205, process flow proceeds to SUB-DIVIDE THE ELECTRONIC IMAGE OF THE PAPER CHECK INTO IMAGE SUB-SECTIONS WITH EACH IMAGE SUB-SECTION BEING ASSOCIATED WITH SPECIFIC PAPER CHECK INFORMATION OPERATION 207.

In one embodiment, at SUB-DIVIDE THE ELECTRONIC IMAGE OF THE PAPER CHECK INTO IMAGE SUB-SECTIONS WITH EACH IMAGE SUB-SECTION BEING ASSOCIATED WITH SPECIFIC PAPER CHECK INFORMATION OPERATION 207 one or more areas of the image of the paper check of CREATE AN ELECTRONIC IMAGE OF THE PAPER CHECK OPERATION 205 that contain desired information are identified and the image of the paper check is sub-divided into image sub-sections based on the content/information displayed in a given area/sub-section.

In one embodiment, at SUB-DIVIDE THE ELECTRONIC IMAGE OF THE PAPER CHECK INTO IMAGE SUB-SECTIONS WITH EACH IMAGE SUB-SECTION BEING ASSOCIATED WITH SPECIFIC PAPER CHECK INFORMATION OPERATION 207 one of the one or more areas of the image of the paper check of CREATE AN ELECTRONIC IMAGE OF THE PAPER CHECK OPERATION 205 that are identified as having desired information/content and sub-divided into image sub-sections based on content is the image sub-section including the payee name information/content.

In one embodiment, at SUB-DIVIDE THE ELECTRONIC IMAGE OF THE PAPER CHECK INTO IMAGE SUB-SECTIONS WITH EACH IMAGE SUB-SECTION BEING ASSOCIATED WITH SPECIFIC PAPER CHECK INFORMATION OPERATION 207 one of the one or more areas of the image of the paper check of CREATE AN ELECTRONIC IMAGE OF THE PAPER CHECK OPERATION 205 that are identified as having desired information/content and sub-divided into image sub-sections based on content is the image sub-section including any check memo entry information/content.

In one embodiment, at SUB-DIVIDE THE ELECTRONIC IMAGE OF THE PAPER CHECK INTO IMAGE SUB-SECTIONS WITH EACH IMAGE SUB-SECTION BEING ASSOCIATED WITH SPECIFIC PAPER CHECK INFORMATION OPERATION 207 the one or more areas of the image of the paper check of CREATE AN ELECTRONIC IMAGE OF THE PAPER CHECK OPERATION 205 that are identified as having desired information/content and sub-divided into image sub-sections based on content are the image sub-sections including any desired information/content.

In one embodiment, at SUB-DIVIDE THE ELECTRONIC IMAGE OF THE PAPER CHECK INTO IMAGE SUB-SECTIONS WITH EACH IMAGE SUB-SECTION BEING ASSOCIATED WITH SPECIFIC PAPER CHECK INFORMATION OPERATION 207 the one or more areas of the image of the paper check of CREATE AN ELECTRONIC IMAGE OF THE PAPER CHECK OPERATION 205 are identified as having desired information/content and sub-divided into image sub-sections based on the typical location of the areas having the desired information/content in a typical paper check.

In one embodiment, at SUB-DIVIDE THE ELECTRONIC IMAGE OF THE PAPER CHECK INTO IMAGE SUB-SECTIONS WITH EACH IMAGE SUB-SECTION BEING ASSOCIATED WITH SPECIFIC PAPER CHECK INFORMATION OPERATION 207 the one or more areas of the image of the paper check of CREATE AN ELECTRONIC IMAGE OF THE PAPER CHECK OPERATION 205 are identified as having desired information/content and sub-divided into image sub-sections based on relative location of the areas with respect to identified key words such as "pay", "pay to" "payable to", "to", "for", "memo", "note", etc.

In one embodiment, at SUB-DIVIDE THE ELECTRONIC IMAGE OF THE PAPER CHECK INTO IMAGE SUB-SECTIONS WITH EACH IMAGE SUB-SECTION BEING ASSOCIATED WITH SPECIFIC PAPER CHECK INFORMATION OPERATION 207 the one or more areas of the image of the paper check of CREATE AN ELECTRONIC IMAGE OF THE PAPER CHECK OPERATION 205 are identified as having desired information/content and sub-divided into image sub-sections based on the typical location of the content in a specific bank's paper check format as identified from printed codes on the paper check.

In one embodiment, at SUB-DIVIDE THE ELECTRONIC IMAGE OF THE PAPER CHECK INTO IMAGE SUB-SECTIONS WITH EACH IMAGE SUB-SECTION BEING ASSOCIATED WITH SPECIFIC PAPER CHECK INFORMATION OPERATION 207 the one or more areas of the image of the paper check of CREATE AN ELECTRONIC IMAGE OF THE PAPER CHECK OPERATION 205 are identified as having desired information/content and sub-divided into image sub-sections based on the typical location of the content/information in a paper checks from given region or country.

In one embodiment, at SUB-DIVIDE THE ELECTRONIC IMAGE OF THE PAPER CHECK INTO IMAGE SUB-SECTIONS WITH EACH IMAGE SUB-SECTION BEING ASSOCIATED WITH SPECIFIC PAPER CHECK INFORMATION OPERATION 207 the one or more areas of the image of the paper check of CREATE AN ELECTRONIC IMAGE OF THE PAPER CHECK OPERATION 205 are identified as having desired information/content and sub-divided into image sub-sections based on any combination of the above methods and/or other method and/or process for identifying an image sub-section and its content discussed herein, and/or known in the art at the time of filing, and/or as developed after the time of filing.

As noted above, FIG. 2A is a representation of one specific example an electronic image of a paper check 251, which in this specific example, includes payee area 260. In this specific example, payee area 260 has been identified as having the desired information/content, i.e., the payee information, and has been sub-divided out of electronic image of a paper check 251 into image sub-section 269 (shown by dotted lines in FIG. 2A) at SUB-DIVIDE THE ELECTRONIC IMAGE OF THE PAPER CHECK INTO IMAGE SUB-SECTIONS WITH EACH IMAGE SUB-SECTION BEING ASSOCIATED WITH SPECIFIC PAPER CHECK INFORMATION OPERATION 207 (FIG. 2) based on any combination of the above methods and/or other method and/or process for identifying an image sub-section and its content discussed herein, and/or known in the art at the time of filing, and/or as developed after the time of filing.

Returning to FIG. 2, in one embodiment, at SUB-DIVIDE THE ELECTRONIC IMAGE OF THE PAPER CHECK INTO IMAGE SUB-SECTIONS WITH EACH IMAGE SUB-SECTION BEING ASSOCIATED WITH SPECIFIC PAPER CHECK INFORMATION OPERATION 207 the one or more areas of the image of the paper check of CREATE AN ELECTRONIC IMAGE OF THE PAPER CHECK OPERATION 205 are identified as having desired information/content and sub-divided into image sub-sections automatically using one or more computing system implemented image processing systems.

In one embodiment, once one or more areas of the image of the paper check of CREATE AN ELECTRONIC IMAGE OF THE PAPER CHECK OPERATION 205 that contain desired information are identified and the image of the paper check is sub-divided into image sub-sections based on the content/information displayed in a given area/sub-section at SUB-DIVIDE THE ELECTRONIC IMAGE OF THE PAPER CHECK INTO IMAGE SUB-SECTIONS WITH EACH IMAGE SUB-SECTION BEING ASSOCIATED WITH SPECIFIC PAPER CHECK INFORMATION OPERATION 207, process flow proceeds to COPY/CUT AT LEAST ONE IMAGE SUB-SECTION ASSOCIATED WITH A DESIRED PORTION OF THE PAPER CHECK INFORMATION OPERATION 209.

In one embodiment, at COPY/CUT AT LEAST ONE IMAGE SUB-SECTION ASSOCIATED WITH A DESIRED PORTION OF THE PAPER CHECK INFORMATION OPERATION 209 one or more of the image sub-sections identified at SUB-DIVIDE THE ELECTRONIC IMAGE OF THE PAPER CHECK INTO IMAGE SUB-SECTIONS WITH EACH IMAGE SUB-SECTION BEING ASSOCIATED WITH SPECIFIC PAPER CHECK INFORMATION OPERATION 207 are copied from the electronic image of the paper check of CREATE AN ELECTRONIC IMAGE OF THE PAPER CHECK OPERATION 205.

In one embodiment, at COPY/CUT AT LEAST ONE IMAGE SUB-SECTION ASSOCIATED WITH A DESIRED PORTION OF THE PAPER CHECK INFORMATION OPERATION 209 one or more of the image sub-sections identified at SUB-DIVIDE THE ELECTRONIC IMAGE OF THE PAPER CHECK INTO IMAGE SUB-SECTIONS WITH EACH IMAGE SUB-SECTION BEING ASSOCIATED WITH SPECIFIC PAPER CHECK INFORMATION OPERATION 207 are copied from the electronic image of the paper check of CREATE AN ELECTRONIC IMAGE OF THE PAPER CHECK OPERATION 205 automatically using one or more computing system implemented image processing and/or Photoshop systems.

In one embodiment, at COPY/CUT AT LEAST ONE IMAGE SUB-SECTION ASSOCIATED WITH A DESIRED PORTION OF THE PAPER CHECK INFORMATION OPERATION 209 one or more of the image sub-sections identified at SUB-DIVIDE THE ELECTRONIC IMAGE OF THE PAPER CHECK INTO IMAGE SUB-SECTIONS WITH EACH IMAGE SUB-SECTION BEING ASSOCIATED WITH SPECIFIC PAPER CHECK INFORMATION OPERATION 207 are copied from the electronic image of the paper check of CREATE AN ELECTRONIC IMAGE OF THE PAPER CHECK OPERATION 205 by any one of numerous methods, means, mechanisms, process, and systems for copying and/or cutting a portion of an electronic image of a paper document that are well known in the art. Consequently, a more detailed discussion of specific methods, means, mechanisms, process, and systems for copying and/or cutting a portion of an electronic image of a paper document are omitted here to avoid detracting from the invention.

In one embodiment, once one or more of the image sub-sections identified at SUB-DIVIDE THE ELECTRONIC IMAGE OF THE PAPER CHECK INTO IMAGE SUB-SECTIONS WITH EACH IMAGE SUB-SECTION BEING ASSOCIATED WITH SPECIFIC PAPER CHECK INFORMATION OPERATION 207 are copied from the electronic image of the paper check of CREATE AN ELECTRONIC IMAGE OF THE PAPER CHECK OPERATION 205 at COPY/CUT AT LEAST ONE IMAGE SUB-SECTION ASSOCIATED WITH A DESIRED PORTION OF THE PAPER CHECK INFORMATION OPERATION 209, the data representing the copied image sub-sections is stored. In one embodiment, the data, in whole, or in part, is stored in a memory system, such as memory systems 103, 153 or server memory system 123, or database 170, of FIG. 1, or in a cache memory, such as cache memory 103A or 153A of FIG. 1, or in any main memory or mass memory, associated with a computing device, such as computing systems 100, 150, described above. In one embodiment, the data, in whole, or in part, is stored in any computing device and/or server system, such as computing systems 100, 150, or server system 120, or other device, in another location, or on/in computer readable medium, and/or any other computer program product, as defined herein. In one embodiment, the data, in whole, or in part, is stored on a webpage or in a web-based system.

Returning to FIG. 2, in some embodiments, the means for storing the data described above are maintained, in whole, or in part, by: the user, or a user computing system; a financial institution; the provider of a parent computing system implemented financial management system employing process for adding check information to an electronic transaction listing 200; the provider of process for adding check information to an electronic transaction listing 200; a third party service; or any other parties.

In one embodiment, once one or more of the image sub-sections identified at SUB-DIVIDE THE ELECTRONIC IMAGE OF THE PAPER CHECK INTO IMAGE SUB-SECTIONS WITH EACH IMAGE SUB-SECTION BEING ASSOCIATED WITH SPECIFIC PAPER CHECK INFORMATION OPERATION 207 are copied from the electronic image of the paper check of CREATE AN ELECTRONIC IMAGE OF THE PAPER CHECK OPERATION 205 at COPY/CUT AT LEAST ONE IMAGE SUB-SECTION ASSOCIATED WITH A DESIRED PORTION OF THE PAPER CHECK INFORMATION OPERATION 209, process flow proceeds to COPY/PASTE THE AT LEAST ONE IMAGE SUB-SECTION ASSOCIATED WITH THE DESIRED PORTION OF THE PAPER CHECK INFORMATION INTO A PAPER CHECK BASED FINANCIAL TRANSACTION ENTRY ASSOCIATED WITH THE PAPER CHECK IN A FINANCIAL TRANSACTION LISTING OPERATION 211.

In one embodiment, at COPY/PASTE THE AT LEAST ONE IMAGE SUB-SECTION ASSOCIATED WITH THE DESIRED PORTION OF THE PAPER CHECK INFORMATION INTO A PAPER CHECK BASED FINANCIAL TRANSACTION ENTRY ASSOCIATED WITH THE PAPER CHECK IN A FINANCIAL TRANSACTION LISTING OPERATION 211 one or more of the copied image sub-sections of COPY/CUT AT LEAST ONE IMAGE SUB-SECTION ASSOCIATED WITH A DESIRED PORTION OF THE PAPER CHECK INFORMATION OPERATION 209 are added to a check based financial transaction listing in a financial transaction list.

In one embodiment, at COPY/PASTE THE AT LEAST ONE IMAGE SUB-SECTION ASSOCIATED WITH THE DESIRED PORTION OF THE PAPER CHECK INFORMATION INTO A PAPER CHECK BASED FINANCIAL TRANSACTION ENTRY ASSOCIATED WITH THE PAPER CHECK IN A FINANCIAL TRANSACTION LISTING OPERATION 211 one or more of the copied image sub-sections of COPY/CUT AT LEAST ONE IMAGE SUB-SECTION ASSOCIATED WITH A DESIRED PORTION OF THE PAPER CHECK INFORMATION OPERATION 209 are added to a check based financial transaction listing in a financial transaction list associated with one or more computing system implemented financial management systems.

As noted above, various computing system implemented financial management systems are available including: computing system implemented on-line banking systems; computing system implemented personal and small business financial management systems; computing system implemented tax preparation systems; computing system implemented business accounting systems; computing system implemented inventory management systems and computing system implemented medical expense management systems; as well as various other electronic transaction data driven financial management systems.

As also noted above, as used herein, the term computing system implemented financial management system includes, but is not limited to: on-line banking systems, packages, programs, modules, or applications; computing system implemented business systems, packages, programs, modules, or applications; on-line banking management systems, packages, programs, modules, or applications; computing system implemented personal and small business financial management systems, packages, programs, modules, or applications; computing system implemented inventory management systems, packages, programs, modules, or applications; computing system implemented tax preparation systems, packages, programs, modules, or applications; computing system implemented accounting and/or invoicing systems, packages, programs, modules, or applications; and various other electronic transaction driven data management systems, packages, programs, modules, or applications.

In one embodiment, the one or more copied image sub-sections of COPY/CUT AT LEAST ONE IMAGE SUB-SECTION ASSOCIATED WITH A DESIRED PORTION OF THE PAPER CHECK INFORMATION OPERATION 209 are added to a check based financial transaction listing in a financial transaction list at COPY/PASTE THE AT LEAST ONE IMAGE SUB-SECTION ASSOCIATED WITH THE DESIRED PORTION OF THE PAPER CHECK INFORMATION INTO A PAPER CHECK BASED FINANCIAL TRANSACTION ENTRY ASSOCIATED WITH THE PAPER CHECK IN A FINANCIAL TRANSACTION LISTING OPERATION 211 as entry information along with the other check based financial transaction information.

In one embodiment, at COPY/PASTE THE AT LEAST ONE IMAGE SUB-SECTION ASSOCIATED WITH THE DESIRED PORTION OF THE PAPER CHECK INFORMATION INTO A PAPER CHECK BASED FINANCIAL TRANSACTION ENTRY ASSOCIATED WITH THE PAPER CHECK IN A FINANCIAL TRANSACTION LISTING OPERATION 211 one or more of the copied image sub-sections of COPY/CUT AT LEAST ONE IMAGE SUB-SECTION ASSOCIATED WITH A DESIRED PORTION OF THE PAPER CHECK INFORMATION OPERATION 209 are added and/or copied and/or pasted into the check based financial transaction listing in a financial transaction list as information displayed in-line, i.e., as part of the same row and/or entry, as the other financial information associated with the check based financial transaction in the financial transaction listing.

FIG. 2B is a representation of a portion of a financial transaction list 290 including a check based financial transaction listing line 270 associated with the electronic image of a paper check 251 of FIG. 2A and including the pasted payee image sub-section 269 of FIG. 2A added into the check based financial transaction listing line 270 in accordance with one embodiment.

Referring to FIGS. 2, 2A, and 2B together, in one embodiment, payee image sub-section 269 is identified and sub-divided out at SUB-DIVIDE THE ELECTRONIC IMAGE OF THE PAPER CHECK INTO IMAGE SUB-SECTIONS WITH EACH IMAGE SUB-SECTION BEING ASSOCIATED WITH SPECIFIC PAPER CHECK INFORMATION OPERATION 207 (FIG. 2). Then at COPY/CUT AT LEAST ONE IMAGE SUB-SECTION ASSOCIATED WITH A DESIRED PORTION OF THE PAPER CHECK INFORMATION OPERATION 209 (FIG. 2) payee image sub-section 269 (FIG. 2A) is copied from the electronic image of the paper check 251 (FIG. 2A) of CREATE AN ELECTRONIC IMAGE OF THE PAPER CHECK OPERATION 205 (FIG. 2). Then at COPY/PASTE THE AT LEAST ONE IMAGE SUB-SECTION ASSOCIATED WITH THE DESIRED PORTION OF THE PAPER CHECK INFORMATION INTO A PAPER CHECK BASED FINANCIAL TRANSACTION ENTRY ASSOCIATED WITH THE PAPER CHECK IN A FINANCIAL TRANSACTION LISTING OPERATION 211 (FIG. 2) payee image sub-section 269 (FIG. 2A and FIG. 2B) is added into the check based financial transaction listing line 270 (FIG. 2B) of financial transaction list 290(FIG. 2B), in the same line, i.e., as in-line information, along with the other check based financial transaction information of check based financial transaction listing line 270 (FIG. 2B).

Those of skill in the art will readily appreciate that the examples discussed above with respect to FIGS. 2A and 2B are merely exemplary and that numerous other examples, data, data layout and data structures can be incorporated with the invention. In addition, the choice of the payee being the desired information and payee image sub-section as the image sub-section of interest was also made for exemplary purposes. In other embodiments, other information and/or content, such as memo data, is desired and other image sub-sections are the image sub-sections of interest. Consequently, the discussions above with respect to FIGS. 2A and 2B do not limit the scope of the claims shown below.

In one embodiment, at COPY/PASTE THE AT LEAST ONE IMAGE SUB-SECTION ASSOCIATED WITH THE DESIRED PORTION OF THE PAPER CHECK INFORMATION INTO A PAPER CHECK BASED FINANCIAL TRANSACTION ENTRY ASSOCIATED WITH THE PAPER CHECK IN A FINANCIAL TRANSACTION LISTING OPERATION 211 one or more of the copied image sub-sections of COPY/CUT AT LEAST ONE IMAGE SUB-SECTION ASSOCIATED WITH A DESIRED PORTION OF THE PAPER CHECK INFORMATION OPERATION 209 are added and/or copied and/or pasted into the check based financial transaction listing in a financial transaction list by any one of numerous methods, means, mechanisms, process, and systems for adding and/or copying and/or pasting a portion of an electronic image into an electronic data document well known in the art. Consequently, a more detailed discussion of specific methods, means, mechanisms, process, and systems for adding and/or copying and/or pasting a portion of an electronic image into an electronic data document are omitted here to avoid detracting from the invention.

Returning to FIG. 2, in one embodiment, once one or more of the copied image sub-sections of COPY/CUT AT LEAST ONE IMAGE SUB-SECTION ASSOCIATED WITH A DESIRED PORTION OF THE PAPER CHECK INFORMATION OPERATION 209 are added to a check based financial transaction listing in a financial transaction list at COPY/PASTE THE AT LEAST ONE IMAGE SUB-SECTION ASSOCIATED WITH THE DESIRED PORTION OF THE PAPER CHECK INFORMATION INTO A PAPER CHECK BASED FINANCIAL TRANSACTION ENTRY ASSOCIATED WITH THE PAPER CHECK IN A FINANCIAL TRANSACTION LISTING OPERATION 211, process flow proceeds to process flow proceeds to EXIT OPERATION 221.

In one embodiment, at EXIT OPERATION 221 process for adding check information to an electronic transaction listing 200 is exited to await new data.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using process for adding check information to an electronic transaction listing 200, the over 50% of all financial transactions currently conducted using paper checks can be displayed in a transaction listing along with any desired information included in the paper check. In addition, using process for adding check information to an electronic transaction listing 200, this desired information included in the paper check is displayed within the electronic transaction listing without requiring any further user input, without waiting for an image to download, and with the use of any addition screen displays. Consequently, using process for adding check information to an electronic transaction listing 200, a user can easily view any and/or all information related to paper check transactions at a glance.

In one embodiment, once the one or more image sub-sections are copied from the electronic image of the paper check and/or the one or more of the copied image sub-sections are added to a check based financial transaction listing in a financial transaction list, the user is provided the opportunity to correlate/translate the image sub-sections to user entered names, categories, and/or other data in computer readable text.

Figure 3:
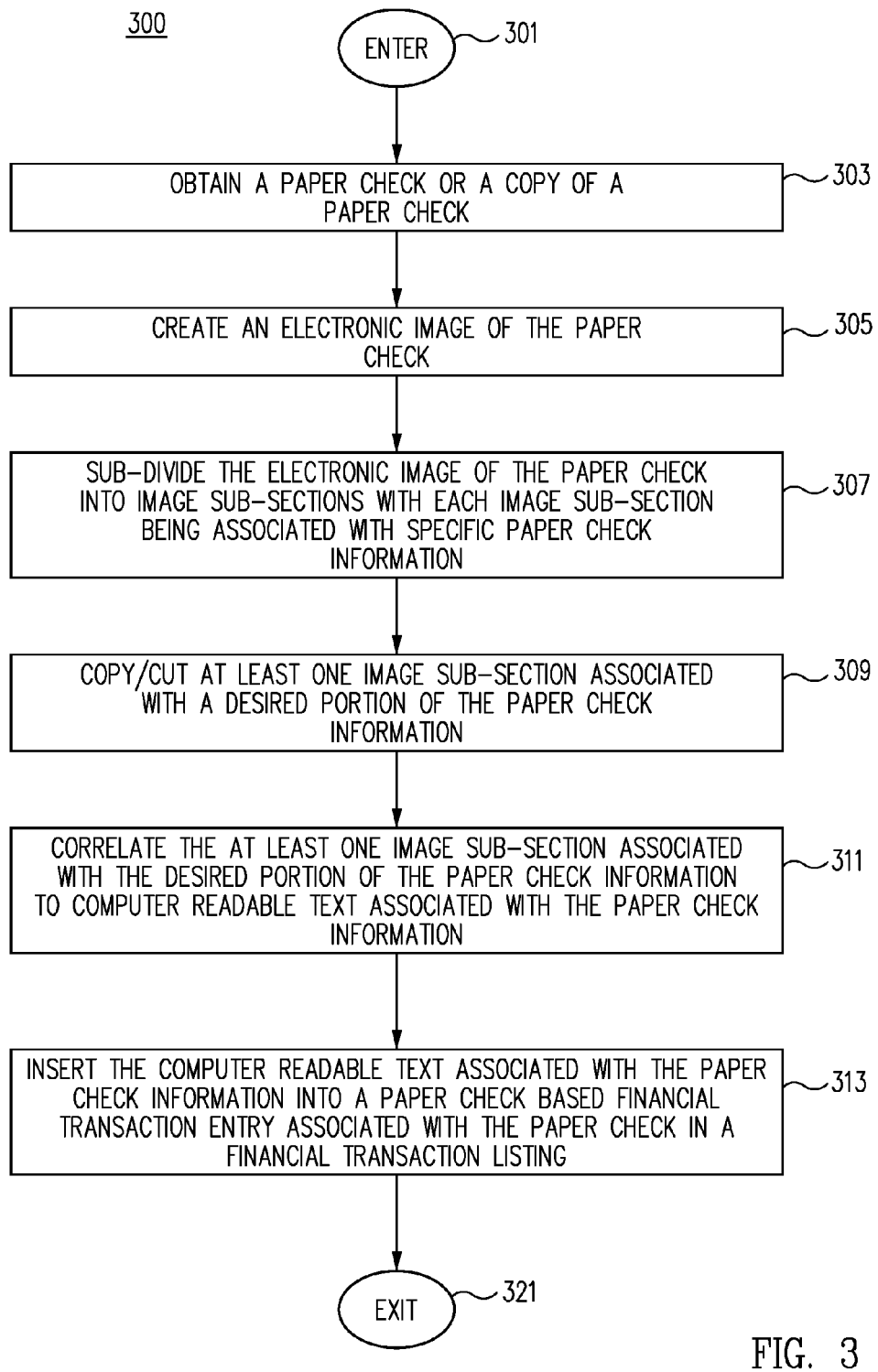
FIG. 3 is a flow chart depicting a process for adding check information to an electronic transaction listing in accordance with one embodiment.

FIG. 3 is a flow chart depicting a process for adding check information to an electronic transaction listing 300 in accordance with one embodiment. Process for adding check information to an electronic transaction listing 300 begins at ENTER OPERATION 301 and process flow proceeds to OBTAIN A PAPER CHECK OR A COPY OF A PAPER CHECK OPERATION 303.

In one embodiment, OBTAIN A PAPER CHECK OR A COPY OF A PAPER CHECK OPERATION 303; CREATE AN ELECTRONIC IMAGE OF THE PAPER CHECK OPERATION 305; SUB-DIVIDE THE ELECTRONIC IMAGE OF THE PAPER CHECK INTO IMAGE SUB-SECTIONS WITH EACH IMAGE SUB-SECTION BEING ASSOCIATED WITH SPECIFIC PAPER CHECK INFORMATION OPERATION 307; and COPY/CUT AT LEAST ONE IMAGE SUB-SECTION ASSOCIATED WITH A DESIRED PORTION OF THE PAPER CHECK INFORMATION OPERATION 309 of process for adding check information to an electronic transaction listing 300 of FIG. 3 are substantially identical to OBTAIN A PAPER CHECK OR A COPY OF A PAPER CHECK OPERATION 203; CREATE AN ELECTRONIC IMAGE OF THE PAPER CHECK OPERATION 205; SUB-DIVIDE THE ELECTRONIC IMAGE OF THE PAPER CHECK INTO IMAGE SUB-SECTIONS WITH EACH IMAGE SUB-SECTION BEING ASSOCIATED WITH SPECIFIC PAPER CHECK INFORMATION OPERATION 207; and COPY/CUT AT LEAST ONE IMAGE SUB-SECTION ASSOCIATED WITH A DESIRED PORTION OF THE PAPER CHECK INFORMATION OPERATION 209 of process for adding check information to an electronic transaction listing 200 of FIG. 2. Consequently, the discussion above with respect to OBTAIN A PAPER CHECK OR A COPY OF A PAPER CHECK OPERATION 203; CREATE AN ELECTRONIC IMAGE OF THE PAPER CHECK OPERATION 205; SUB-DIVIDE THE ELECTRONIC IMAGE OF THE PAPER CHECK INTO IMAGE SUB-SECTIONS WITH EACH IMAGE SUB-SECTION BEING ASSOCIATED WITH SPECIFIC PAPER CHECK INFORMATION OPERATION 207; and COPY/CUT AT LEAST ONE IMAGE SUB-SECTION ASSOCIATED WITH A DESIRED PORTION OF THE PAPER CHECK INFORMATION OPERATION 209 of process for adding check information to an electronic transaction listing 200 of FIG. 2 is applicable to, and incorporated here for OBTAIN A PAPER CHECK OR A COPY OF A PAPER CHECK OPERATION 303; CREATE AN ELECTRONIC IMAGE OF THE PAPER CHECK OPERATION 305; SUB-DIVIDE THE ELECTRONIC IMAGE OF THE PAPER CHECK INTO IMAGE SUB-SECTIONS WITH EACH IMAGE SUB-SECTION BEING ASSOCIATED WITH SPECIFIC PAPER CHECK INFORMATION OPERATION 307; and COPY/CUT AT LEAST ONE IMAGE SUB-SECTION ASSOCIATED WITH A DESIRED PORTION OF THE PAPER CHECK INFORMATION OPERATION 309 of process for adding check information to an electronic transaction listing 300 of FIG. 3.

In one embodiment, once one or more of the image sub-sections identified at SUB-DIVIDE THE ELECTRONIC IMAGE OF THE PAPER CHECK INTO IMAGE SUB-SECTIONS WITH EACH IMAGE SUB-SECTION BEING ASSOCIATED WITH SPECIFIC PAPER CHECK INFORMATION OPERATION 307 are copied from the electronic image of the paper check of CREATE AN ELECTRONIC IMAGE OF THE PAPER CHECK OPERATION 305 at COPY/CUT AT LEAST ONE IMAGE SUB-SECTION ASSOCIATED WITH A DESIRED PORTION OF THE PAPER CHECK INFORMATION OPERATION 309, process flow proceeds to CORRELATE THE AT LEAST ONE IMAGE SUB-SECTION ASSOCIATED WITH THE DESIRED PORTION OF THE PAPER CHECK INFORMATION TO COMPUTER READABLE TEXT ASSOCIATED WITH THE PAPER CHECK INFORMATION OPERATION 311.

In one embodiment, at CORRELATE THE AT LEAST ONE IMAGE SUB-SECTION ASSOCIATED WITH THE DESIRED PORTION OF THE PAPER CHECK INFORMATION TO COMPUTER READABLE TEXT ASSOCIATED WITH THE PAPER CHECK INFORMATION OPERATION 311 the user is provided the opportunity to correlate/translate the image sub-sections of COPY/CUT AT LEAST ONE IMAGE SUB-SECTION ASSOCIATED WITH A DESIRED PORTION OF THE PAPER CHECK INFORMATION OPERATION 309 to user entered names, categories, and/or other data in computer readable text.

For instance, in one embodiment, once an image sub-section including a payee name of SUB-DIVIDE THE ELECTRONIC IMAGE OF THE PAPER CHECK INTO IMAGE SUB-SECTIONS WITH EACH IMAGE SUB-SECTION BEING ASSOCIATED WITH SPECIFIC PAPER CHECK INFORMATION OPERATION 307 is copied at COPY/CUT AT LEAST ONE IMAGE SUB-SECTION ASSOCIATED WITH A DESIRED PORTION OF THE PAPER CHECK INFORMATION OPERATION 309 from the electronic image of a paper check of CREATE AN ELECTRONIC IMAGE OF THE PAPER CHECK OPERATION 305, the user is provided the opportunity manually enter the payee name in a computer readable text format.

In one embodiment, the user is provided the opportunity enter the payee name in a computer readable text format at CORRELATE THE AT LEAST ONE IMAGE SUB-SECTION ASSOCIATED WITH THE DESIRED PORTION OF THE PAPER CHECK INFORMATION TO COMPUTER READABLE TEXT ASSOCIATED WITH THE PAPER CHECK INFORMATION OPERATION 311 through a text entry field in a user interface using a user interface device, such as a keyboard, mouse, touchpad, voice recognition software, or any other device and/or system capable of providing user input to a computing system and/or for converting user actions into computing system operations, whether available or known at the time of filing or as developed later, such as keyboards 107, 157, and/or mice 111, 161 of FIG. 1 and/or a user interface screen, on a display device of a computing system, such as display devices 111, 165 or 125 of FIG. 1 or any other device capable of displaying data, whether known at the time of filing or as later developed. As discussed below, then, whenever another image sub-section including what appears to be the same, or similar, information is detected in an electronic image of a second, or other, paper check, the computer readable text is substituted and/or included in the check based financial transaction listing associated with the second, or other, paper check in a financial transaction list, as computer readable text. Consequently, the payee name, memo information, signature information, or other data, in computer readable text can be used by any computing system implemented financial management system to automatically add computer readable information to, and/or categorize, multiple check based transactions.

As one specific example, at CORRELATE THE AT LEAST ONE IMAGE SUB-SECTION ASSOCIATED WITH THE DESIRED PORTION OF THE PAPER CHECK INFORMATION TO COMPUTER READABLE TEXT ASSOCIATED WITH THE PAPER CHECK INFORMATION OPERATION 311 the user is provided the opportunity to enter a computer readable text name to be associated with one or more image sub-sections of COPY/CUT AT LEAST ONE IMAGE SUB-SECTION ASSOCIATED WITH A DESIRED PORTION OF THE PAPER CHECK INFORMATION OPERATION 309 that include a payee name. As discussed below, then, whenever another image sub-section including what appears to be the same or similar payee name is detected in an electronic image of a second, or other, paper check, the computer readable text version of the payee name is substituted and/or included in the check based financial transaction listing associated with the second, or other, paper check in a financial transaction list, as computer readable text.

As another specific example, at CORRELATE THE AT LEAST ONE IMAGE SUB-SECTION ASSOCIATED WITH THE DESIRED PORTION OF THE PAPER CHECK INFORMATION TO COMPUTER READABLE TEXT ASSOCIATED WITH THE PAPER CHECK INFORMATION OPERATION 311 the user is provided the opportunity to enter a computer readable text version of a category to be associated with one or more image sub-sections of COPY/CUT AT LEAST ONE IMAGE SUB-SECTION ASSOCIATED WITH A DESIRED PORTION OF THE PAPER CHECK INFORMATION OPERATION 309 that including a payee name. As discussed below, then, whenever another image sub-section including what appears to be the same or similar payee name is detected in an electronic image of a second, or other, paper check, the computer readable text version of the category associated with the payee name is substituted and/or included in the check based financial transaction listing associated with the second, or other, paper check in a financial transaction list, as computer readable text.

As another example, in one embodiment, at CORRELATE THE AT LEAST ONE IMAGE SUB-SECTION ASSOCIATED WITH THE DESIRED PORTION OF THE PAPER CHECK INFORMATION TO COMPUTER READABLE TEXT ASSOCIATED WITH THE PAPER CHECK INFORMATION OPERATION 311 the user is provided the opportunity enter a computer readable text version of a category to be associated with one or more image sub-sections of COPY/CUT AT LEAST ONE IMAGE SUB-SECTION ASSOCIATED WITH A DESIRED PORTION OF THE PAPER CHECK INFORMATION OPERATION 309 that include a memo entry. As discussed below, then, whenever another image sub-section including what appears to be the same or similar memo entry is detected in an electronic image of a second, or other, paper check, the computer readable text version of the category is included in the check based financial transaction listing associated with the second, or other, paper check in a financial transaction list, as computer readable text.

As another example, at CORRELATE THE AT LEAST ONE IMAGE SUB-SECTION ASSOCIATED WITH THE DESIRED PORTION OF THE PAPER CHECK INFORMATION TO COMPUTER READABLE TEXT ASSOCIATED WITH THE PAPER CHECK INFORMATION OPERATION 311 the user is provided the opportunity to tag, or otherwise mark, one or more image sub-sections of COPY/CUT AT LEAST ONE IMAGE SUB-SECTION ASSOCIATED WITH A DESIRED PORTION OF THE PAPER CHECK INFORMATION OPERATION 309 to correlate the one or more image sub-sections to a given category. As discussed below, then, whenever a second, or other, image sub-section including what appears to be the same or similar information, i.e., a similar image sub-section, is detected in an electronic image of a second, or other, paper check, the same category is included in the check based financial transaction listing associated with the second, or other, paper check in a financial transaction list.

In one embodiment, at CORRELATE THE AT LEAST ONE IMAGE SUB-SECTION ASSOCIATED WITH THE DESIRED PORTION OF THE PAPER CHECK INFORMATION TO COMPUTER READABLE TEXT ASSOCIATED WITH THE PAPER CHECK INFORMATION OPERATION 311 the user is provided the opportunity apply two or more tags to any one image sub-section of COPY/CUT AT LEAST ONE IMAGE SUB-SECTION ASSOCIATED WITH A DESIRED PORTION OF THE PAPER CHECK INFORMATION OPERATION 309, to correlate the one or more image sub-sections to two or more categories. As discussed below, then, whenever a second, or other, image sub-section including what appears to be the same or similar information, i.e., a similar image sub-section, is detected in an electronic image of a second, or other, paper check, the same two or more categories are included in the check based financial transaction listing associated with the second, or other, paper check in a financial transaction list.

In one embodiment, once the user is provided the opportunity to correlate/translate the image sub-sections of COPY/CUT AT LEAST ONE IMAGE SUB-SECTION ASSOCIATED WITH A DESIRED PORTION OF THE PAPER CHECK INFORMATION OPERATION 309 to user entered names, categories, and/or other data in computer readable text at CORRELATE THE AT LEAST ONE IMAGE SUB-SECTION ASSOCIATED WITH THE DESIRED PORTION OF THE PAPER CHECK INFORMATION TO COMPUTER READABLE TEXT ASSOCIATED WITH THE PAPER CHECK INFORMATION OPERATION 311, process flow proceeds to INSERT THE COMPUTER READABLE TEXT ASSOCIATED WITH THE PAPER CHECK INFORMATION INTO A PAPER CHECK BASED FINANCIAL TRANSACTION ENTRY ASSOCIATED WITH THE PAPER CHECK IN A FINANCIAL TRANSACTION LISTING OPERATION 313.

In one embodiment, at INSERT THE COMPUTER READABLE TEXT ASSOCIATED WITH THE PAPER CHECK INFORMATION INTO A PAPER CHECK BASED FINANCIAL TRANSACTION ENTRY ASSOCIATED WITH THE PAPER CHECK IN A FINANCIAL TRANSACTION LISTING OPERATION 313 whenever similar image sub-sections including one or more similar payee names, or one or more image sub-sections including one or more similar memo entries, or one or more image sub-sections including similar signature information, are copied from, and/or detected in, the electronic image of other paper checks at COPY/CUT AT LEAST ONE IMAGE SUB-SECTION ASSOCIATED WITH A DESIRED PORTION OF THE PAPER CHECK INFORMATION OPERATION 309 the computer readable text and/or tags of CORRELATE THE AT LEAST ONE IMAGE SUB-SECTION ASSOCIATED WITH THE DESIRED PORTION OF THE PAPER CHECK INFORMATION TO COMPUTER READABLE TEXT ASSOCIATED WITH THE PAPER CHECK INFORMATION OPERATION 311 is/are substituted and/or included in the check based financial transaction listings for the other paper checks in a financial transaction list. Consequently, the payee name, memo entry, signature, or other data, image sub-sections can be used to automatically add information and/or categorize the check based transactions.

In one embodiment, at INSERT THE COMPUTER READABLE TEXT ASSOCIATED WITH THE PAPER CHECK INFORMATION INTO A PAPER CHECK BASED FINANCIAL TRANSACTION ENTRY ASSOCIATED WITH THE PAPER CHECK IN A FINANCIAL TRANSACTION LISTING OPERATION 313 whenever similar image sub-sections including one or more payee names, or one or more image sub-sections including one or more memo entries, or one or more image sub-sections including signatures are copied from the electronic image of paper checks at COPY/CUT AT LEAST ONE IMAGE SUB-SECTION ASSOCIATED WITH A DESIRED PORTION OF THE PAPER CHECK INFORMATION OPERATION 309 the computer readable text and/or tags of CORRELATE THE AT LEAST ONE IMAGE SUB-SECTION ASSOCIATED WITH THE DESIRED PORTION OF THE PAPER CHECK INFORMATION TO COMPUTER READABLE TEXT ASSOCIATED WITH THE PAPER CHECK INFORMATION OPERATION 311 is substituted and/or included in the check based financial transaction listing in a financial transaction list. Consequently, the payee name, memo entry, signature, or other data, image sub-sections can be used to automatically categorize the check based transactions.

In various embodiments, any method, means, process and/or system is utilized at COPY/CUT AT LEAST ONE IMAGE SUB-SECTION ASSOCIATED WITH A DESIRED PORTION OF THE PAPER CHECK INFORMATION OPERATION 309 to substitute the computer readable text for the image sub-section such as any of those discussed herein, known in the art at the time of filing, and/or as developed after the time of filing.

Several methods, means, processes and systems for substituting computer readable text for an electronic image are known in the art. Consequently, a more detailed discussion of specific methods, means, processes and systems for substituting computer readable text for an electronic image is omitted her to avoid detracting from the invention.

In one embodiment, at INSERT THE COMPUTER READABLE TEXT ASSOCIATED WITH THE PAPER CHECK INFORMATION INTO A PAPER CHECK BASED FINANCIAL TRANSACTION ENTRY ASSOCIATED WITH THE PAPER CHECK IN A FINANCIAL TRANSACTION LISTING OPERATION 313 the computer readable text of CORRELATE THE AT LEAST ONE IMAGE SUB-SECTION ASSOCIATED WITH THE DESIRED PORTION OF THE PAPER CHECK INFORMATION TO COMPUTER READABLE TEXT ASSOCIATED WITH THE PAPER CHECK INFORMATION OPERATION 311 is substituted and/or included in the check based financial transaction listing in a financial transaction list associated with one or more computing system implemented financial management systems.

In one embodiment, at INSERT THE COMPUTER READABLE TEXT ASSOCIATED WITH THE PAPER CHECK INFORMATION INTO A PAPER CHECK BASED FINANCIAL TRANSACTION ENTRY ASSOCIATED WITH THE PAPER CHECK IN A FINANCIAL TRANSACTION LISTING OPERATION 313 the computer readable text of CORRELATE THE AT LEAST ONE IMAGE SUB-SECTION ASSOCIATED WITH THE DESIRED PORTION OF THE PAPER CHECK INFORMATION TO COMPUTER READABLE TEXT ASSOCIATED WITH THE PAPER CHECK INFORMATION OPERATION 311 is substituted and/or included in the check based financial transaction listing in a financial transaction list as in entry information along with the other check based financial transaction information.

In one embodiment, at INSERT THE COMPUTER READABLE TEXT ASSOCIATED WITH THE PAPER CHECK INFORMATION INTO A PAPER CHECK BASED FINANCIAL TRANSACTION ENTRY ASSOCIATED WITH THE PAPER CHECK IN A FINANCIAL TRANSACTION LISTING OPERATION 313 the computer readable text of CORRELATE THE AT LEAST ONE IMAGE SUB-SECTION ASSOCIATED WITH THE DESIRED PORTION OF THE PAPER CHECK INFORMATION TO COMPUTER READABLE TEXT ASSOCIATED WITH THE PAPER CHECK INFORMATION OPERATION 311 is substituted and/or included in the check based financial transaction listing in a financial transaction list as information displayed in-line, i.e., as part of the same row and/or entry, as the other financial information associated with the check based financial transaction in the financial transaction listing.

In one embodiment, at INSERT THE COMPUTER READABLE TEXT ASSOCIATED WITH THE PAPER CHECK INFORMATION INTO A PAPER CHECK BASED FINANCIAL TRANSACTION ENTRY ASSOCIATED WITH THE PAPER CHECK IN A FINANCIAL TRANSACTION LISTING OPERATION 313 the computer readable text of CORRELATE THE AT LEAST ONE IMAGE SUB-SECTION ASSOCIATED WITH THE DESIRED PORTION OF THE PAPER CHECK INFORMATION TO COMPUTER READABLE TEXT ASSOCIATED WITH THE PAPER CHECK INFORMATION OPERATION 311 is substituted and/or included in the check based financial transaction listing in a financial transaction list by any one of numerous methods, means, mechanisms, process, and systems for adding and/or copying and/or pasting electronic data into an electronic data document well known in the art. Consequently, a more detailed discussion of specific methods, means, mechanisms, process, and systems for adding and/or copying and/or pasting electronic data into an electronic data document are omitted here to avoid detracting from the invention.

In one embodiment, once the computer readable text of CORRELATE THE AT LEAST ONE IMAGE SUB-SECTION ASSOCIATED WITH THE DESIRED PORTION OF THE PAPER CHECK INFORMATION TO COMPUTER READABLE TEXT ASSOCIATED WITH THE PAPER CHECK INFORMATION OPERATION 311 is substituted and/or included in the check based financial transaction listing in a financial transaction list at INSERT THE COMPUTER READABLE TEXT ASSOCIATED WITH THE PAPER CHECK INFORMATION INTO A PAPER CHECK BASED FINANCIAL TRANSACTION ENTRY ASSOCIATED WITH THE PAPER CHECK IN A FINANCIAL TRANSACTION LISTING OPERATION 313, process flow proceeds to EXIT OPERATION 321.

In one embodiment, at EXIT OPERATION 321 process for adding check information to an electronic transaction listing 300 is exited to await new data.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using process for adding check information to an electronic transaction listing 300, the displayed information included in the paper check is converted into computer readable data with minimal user interaction and then re-used/substituted to automatically include the desired information in the electronic transaction listing, as computer readable data, in all subsequent listing of similar paper check based transactions. Consequently, using process for adding check information to an electronic transaction listing 300, computing system implemented financial management systems can automatically categorize check based transactions.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein is merely exemplary, and not mandatory or significant.

Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "obtaining" "creating", "sub-dividing", "copying", "correlating", "storing", "inserting", "categorizing", "providing", "adjusting", "modifying", "updating", "displaying" etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s for method and apparatus and/or process or application for adding check information to an electronic transaction listing, discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented process for adding check information to an electronic transaction listing comprising:

obtaining an electronic image of a paper check;

analyzing the electronic image of the paper check to identify an area of the electronic image of the paper check containing desired information;

sub-dividing the electronic image of the paper check into two or more image sub-sections, at least one of the image sub-sections being a desired information image sub-section that includes at least part of the area of the electronic image of the paper check containing the desired information;

copying desired information image sub-section;

adding the desired information image sub-section to a check based financial transaction entry in a financial transaction listing;

correlating the desired information image sub-section to computer readable text provided by a user through a user interface device; and substituting the computer readable text for desired information image sub-section in a check based financial transaction entry in a financial transaction listing.

2. The computing system implemented process for adding check information to an electronic transaction listing of claim 1, wherein:

correlating the desired information image sub-section to computer readable text provided by a user through a user interface device comprises correlating a desired information image sub-section including payee information to computer readable text indicating the payee information.

3. The computing system implemented process for adding check information to an electronic transaction listing of claim 1, wherein:

correlating the desired information image sub-section to computer readable text provided by a user through a user interface device comprises correlating a desired information image sub-section including payee information to computer readable text indicating a financial transaction category associated with the paper check.

4. The computing system implemented process for adding check information to an electronic transaction listing of claim 1, wherein:
correlating the desired information image sub-section to computer readable text provided by a user through a user interface device comprises correlating a desired information image sub-section including note/memo information to computer readable text indicating a financial transaction category associated with the paper check.

5. The computing system implemented process for adding check information to an electronic transaction listing of claim 1, wherein:
the computer readable text is substituted for desired information image sub-section in a check based financial transaction entry in a financial transaction listing as an in-line entry.

6. A system for adding check information to an electronic transaction listing comprising:
a computing system;
a computing system implemented financial management system;
a financial transaction listing associated with the computing system implemented financial management system; and
a processor for executing a process for adding check information to an electronic transaction listing, the process for adding check information to an electronic transaction listing comprising:
obtaining an electronic image of a paper check;
analyzing the electronic image of the paper check to identify an area of the electronic image of the paper check containing desired information;
sub-dividing the electronic image of the paper check into two or more image sub-sections, at least one of the image sub-sections being a desired information image sub-section that includes at least part of the area of the electronic image of the paper check containing the desired information;
copying desired information image sub-section; and
adding the desired information image sub-section to a check based financial transaction entry in the financial transaction listing associated with the computing system implemented financial management system;
correlating the desired information image sub-section to computer readable text provided by a user through a user interface device; and
substituting the computer readable text for desired information image sub-section in a check based financial transaction entry in the financial transaction listing associated with the computing system implemented financial management system.

7. The system for adding check information to an electronic transaction listing of claim 6, wherein:
correlating the desired information image sub-section to computer readable text provided by a user through a user interface device comprises correlating a desired information image sub-section including payee information to computer readable text indicating the payee information.

8. The system for adding check information to an electronic transaction listing of claim 6, wherein:
correlating the desired information image sub-section to computer readable text provided by a user through a user interface device comprises correlating a desired information image sub-section including payee information to computer readable text indicating a financial transaction category associated with the paper check.

9. The system for adding check information to an electronic transaction listing of claim 6, wherein:
correlating the desired information image sub-section to computer readable text provided by a user through a user interface device comprises correlating a desired information image sub-section including note/memo information to computer readable text indicating a financial transaction category associated with the paper check.

10. The system for adding check information to an electronic transaction listing of claim 6, wherein:
the computer readable text is substituted for desired information image sub-section in a check based financial transaction entry in a financial transaction listing as an in-line entry.

11. A computer program product for adding check information to an electronic transaction listing comprising:
a nontransitory computer readable medium;
and computer program code, encoded on the computer readable medium, comprising computer readable instructions which, when executed on a processor, perform a process for:
obtaining an electronic image of a paper check;
analyzing the electronic image of the paper check to identify an area of the electronic image of the paper check containing desired information;
sub-dividing the electronic image of the paper check into two or more image sub-sections, at least one of the image sub-sections being a desired information image sub-section that includes at least part of the area of the electronic image of the paper check containing the desired information;
copying desired information image sub-section;
adding the desired information image sub-section to a check based financial transaction entry in a financial transaction listing;
correlating the desired information image sub-section to computer readable text provided by a user through a user interface device; and
substituting the computer readable text for desired information image sub-section in a check based financial transaction entry in a financial transaction listing.

12. The computer program product for adding check information to an electronic transaction listing of claim 11, wherein:
correlating the desired information image sub-section to computer readable text provided by a user through a user interface device comprises correlating a desired information image sub-section including payee information to computer readable text indicating the payee information.

13. The computer program product for adding check information to an electronic transaction listing of claim 11, wherein:
correlating the desired information image sub-section to computer readable text provided by a user through a user interface device comprises correlating a desired information image sub-section including payee information to computer readable text indicating a financial transaction category associated with the paper check.

14. The computer program product for adding check information to an electronic transaction listing of claim 11, wherein:

correlating the desired information image sub-section to computer readable text provided by a user through a user interface device comprises correlating a desired information image sub-section including note/memo information to computer readable text indicating a financial transaction category associated with the paper check.

15. The computer program product for adding check information to an electronic transaction listing of claim 11, wherein:

the computer readable text is substituted for desired information image sub-section in a check based financial transaction entry in a financial transaction listing as an in-line entry.

\* \* \* \* \*